(12) United States Patent
Kim

(10) Patent No.: US 12,238,068 B2
(45) Date of Patent: Feb. 25, 2025

(54) SERVICE SERVER CAPABLE OF PERFORMING INTERNET ACCESS MANAGEMENT SERVICES ACCORDING TO GRADES AND THE OPERATING METHOD THEREOF

(71) Applicant: FRANKLIN TECHNOLOGY INC., Seoul (KR)

(72) Inventor: Ok Chae Kim, Seoul (KR)

(73) Assignee: FRANKLIN TECHNOLOGY INC., Seoul (KR)

( * ) Notice: Subject to any disclaimer, the term of this patent is extended or adjusted under 35 U.S.C. 154(b) by 191 days.

(21) Appl. No.: 18/143,041

(22) Filed: May 3, 2023

(65) Prior Publication Data
US 2024/0098064 A1   Mar. 21, 2024

(30) Foreign Application Priority Data
Sep. 15, 2022  (KR) .......................... 10-2022-0116375

(51) Int. Cl.
*H04L 9/40* (2022.01)
(52) U.S. Cl.
CPC ........ *H04L 63/0263* (2013.01); *H04L 63/105* (2013.01); *H04L 63/108* (2013.01)
(58) Field of Classification Search
CPC . H04L 63/0263; H04L 63/105; H04L 63/108; H04L 63/101
See application file for complete search history.

(56) References Cited

U.S. PATENT DOCUMENTS

| | | | | |
|---|---|---|---|---|
| 2003/0091193 A1* | 5/2003 | Bunimov | ............... | H04L 9/065 380/278 |
| 2008/0028436 A1* | 1/2008 | Hannel | .................. | H04L 63/04 726/1 |
| 2008/0109876 A1* | 5/2008 | Hitomi | ................ | G06F 21/6218 726/2 |
| 2011/0173683 A1* | 7/2011 | Roach | ................... | H04L 63/104 726/4 |
| 2015/0350178 A1* | 12/2015 | Yang | ....................... | G06F 21/31 713/168 |

FOREIGN PATENT DOCUMENTS

| | | |
|---|---|---|
| KR | 10-0483558 B1 | 4/2005 |
| KR | 10-0780393 B1 | 11/2007 |
| KR | 10-2009-0101672 A | 9/2009 |
| KR | 10-1511474 B1 | 4/2015 |
| KR | 10-1874395 B1 | 7/2018 |
| KR | 10-2421572 B1 | 7/2022 |

* cited by examiner

*Primary Examiner* — Amie C. Lin
(74) *Attorney, Agent, or Firm* — Park, Kim & Suh, LLC

(57) ABSTRACT

Disclosed are a service server capable of performing Internet access management services according to grades and the operating method thereof, which when a request for permission to access a web page is received from a client terminal, confirm an access authority degree set in the client terminal based on unique identification information of the client terminal, determine whether the client terminal is a terminal having an authority capable of accessing the web page based on access authority degree, and control whether the client terminal accesses the web page based on a determination result.

11 Claims, 2 Drawing Sheets

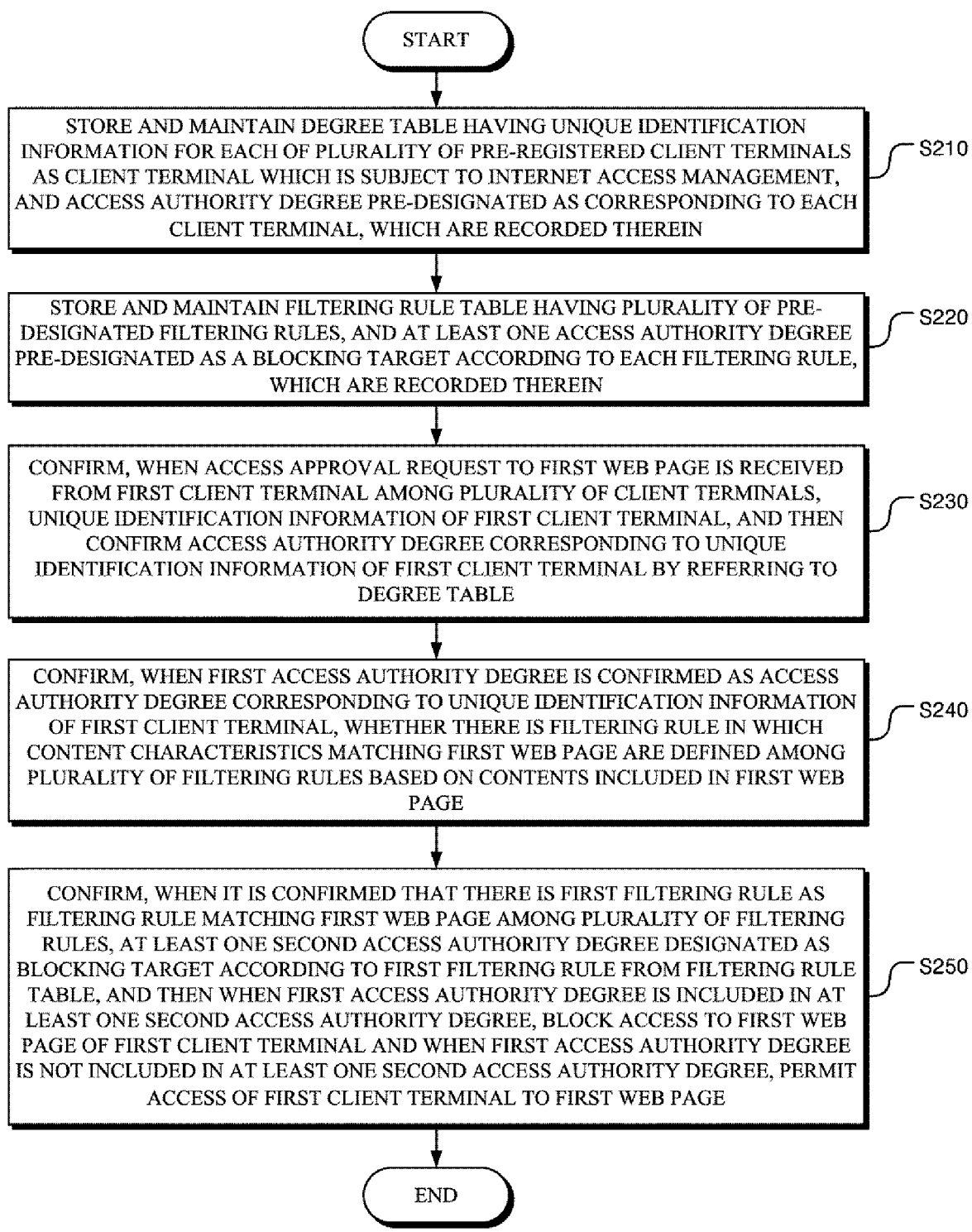

SERVICE SERVER CAPABLE OF PERFORMING INTERNET ACCESS MANAGEMENT SERVICES ACCORDING TO GRADES AND THE OPERATING METHOD THEREOF

CROSS-REFERENCE TO RELATED APPLICATIONS

This application claims priority to and the benefit of Korean Patent Application No. 10-2022-0116375 filed in the Korean Intellectual Property Office on Sep. 15, 2022, the entire contents of which are incorporated herein by reference.

TECHNICAL FIELD

The present invention relates to a service server capable of performing Internet access management services according to grades and the operating method thereof.

BACKGROUND ART

Recently, as various Internet-capable electronic devices such as desktop PCs, smart phones, and tablet PCs have been spread, the use of the Internet using these electronic devices has increased.

In that on the Internet, there are many web pages that deliver useful information to users, but there are also many web pages that contain harmful information, it is necessary to properly control Internet use for users who still lack self-control, such as children and adolescents, guardians need to properly control the use of the Internet.

In addition, companies and institutions often use the Internet for work, and in that there are many cases in which employees access web pages containing content unrelated to work during work hours, in order to increase work efficiency, it is necessary to properly control Internet use.

In this regard, since electronic devices have unique identification information such as MAC (Media Access Control) addresses and IMEI (International Mobile Equipment Identity), introducing a system that blocks access to harmful web pages or web pages that are not related to work by managing the Internet use of the device based on the unique identification information of the target device to control Internet use can be considered.

SUMMARY OF THE INVENTION

The present invention has been made in an effort to provide a service server capable of performing Internet access management services according to grades and the operating method thereof, which when a request for permission to access a web page is received from a client terminal, confirm an access authority degree set in the client terminal based on unique identification information of the client terminal, determine whether the client terminal is a terminal having an authority capable of accessing the web page based on the access authority degree, and control whether the client terminal accesses the web page based on a determination result to control the access of the client terminal to harmful sites, etc.

An exemplary embodiment of the present invention provides a service server capable of performing Internet access management services according to degrees, which includes: a degree table maintenance unit storing and maintaining a degree table having unique identification information for each of a plurality of pre-registered client terminals as a client terminal which is subject to Internet access management, and an access authority degree pre-designated as corresponding to each client terminal—the access authority degree is a degree selected from among a plurality of access authority degrees divided into two or more stages-, which are recorded therein; a rule table maintenance unit storing and maintaining a filtering rule table having a plurality of pre-designated filtering rules, wherein the plurality of filtering rules are rules that define content characteristics for selecting a web page which is subject to access blocking, and at least one access authority degree pre-designated as a blocking target according to each filtering rule, wherein the at least one access authority degree is a degree selected from among the plurality of access authority degrees, which are recorded therein; a degree confirmation unit confirming, when an access approval request to the first web page is received from a first client terminal among the plurality of client terminals, unique identification information of the first client terminal, and then confirming an access authority degree corresponding to the unique identification information of the first client terminal by referring to the degree table; a rule confirmation unit confirming, when a first access authority degree is confirmed as the access authority degree corresponding to the unique identification information of the first client terminal, whether there is a filtering rule in which content characteristics matching the first web page are defined among the plurality of filtering rules based on contents included in the first web page; and an access control unit confirming, when it is confirmed that there is the first filtering rule as the filtering rule matching the first web page among the plurality of filtering rules, at least one second access authority degree designated as the blocking target according to the first filtering rule from the filtering rule table, and then when the first access authority degree is included in the at least one second access authority degree, blocking the access to the first web page of the first client terminal and when the first access authority degree is not included in the at least one second access authority degree, permitting the access of the first client terminal to the first web page.

Another exemplary embodiment of the present invention provides an operating method of a service server capable of performing Internet access management services according to degrees, which includes: storing and maintaining a degree table having unique identification information for each of a plurality of pre-registered client terminals as a client terminal which is subject to Internet access management, and an access authority degree pre-designated as corresponding to each client terminal—the access authority degree is a degree selected from among a plurality of access authority degrees divided into two or more stages-, which are recorded therein; storing and maintaining a filtering rule table having a plurality of pre-designated filtering rules, wherein the plurality of filtering rules are rules that define content characteristics for selecting a web page which is subject to access blocking, and at least one access authority degree pre-designated as a blocking target according to each filtering rule, wherein the at least one access authority degree is a degree selected from among the plurality of access authority degrees, which are recorded therein; confirming, when an access approval request to the first web page is received from a first client terminal among the plurality of client terminals, unique identification information of the first client terminal, and then confirming an access authority degree corresponding to the unique identification information of the first client terminal by referring to the degree table; confirming, when a first access authority degree is confirmed as the access authority degree corresponding to the unique identification information of the first client terminal, whether there is a filtering rule in which content characteristics matching the first web page are defined among the plurality of filtering rules based on contents included in the first web page; and confirming, when it is confirmed that there is the first filtering rule as the filtering rule matching the first web page among the plurality of filtering rules, at least one second access authority degree designated as the blocking target according to the first filtering rule from the filtering rule table, and then when the first access authority degree is included in the at least one second access authority degree, blocking the access to the first web page of the first client terminal and when the first access authority degree is not included in the at least one second access authority degree, permitting the access of the first client terminal to the first web page.

According to exemplary embodiment of the present invention, a service server capable of performing Internet access management services according to grades and the operating method thereof, which when a request for permission to access a web page is received from a client terminal, confirm an access authority degree set in the client terminal based on unique identification information of the client terminal, determine whether the client terminal is a terminal having an authority capable of accessing the web page based on the access authority degree, and control whether the client terminal accesses the web page based on a determination result are provided to support to enable controlling the access of the client terminal to harmful sites, etc.

BRIEF DESCRIPTION OF THE DRAWINGS

FIG. 2 is a flowchart illustrating an operating method of a service server according to the present invention.

DETAILED DESCRIPTION

Figure 1:
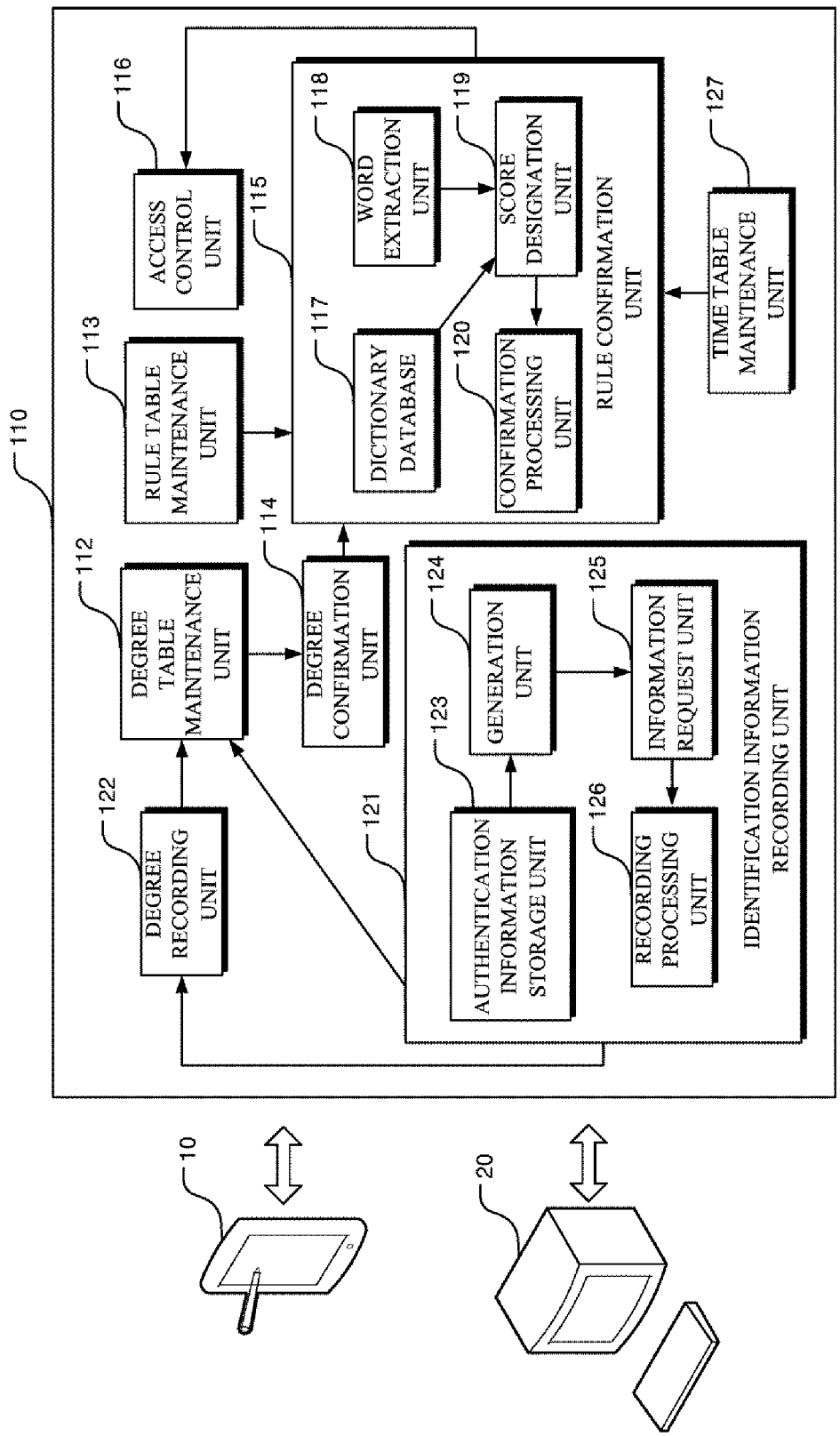
FIG. 1 is a diagram illustrating a structure of a service server according to the present invention.

Hereinafter, exemplary embodiments of the present invention will be described in detail with reference to the accompanying drawings.

The description does not limit the present invention to specific exemplary embodiments, and it should be understood that the present invention covers all the modifications, equivalents and replacements included within the idea and technical scope of the present invention.

In describing each drawing, like reference numerals refer to like elements and if not contrarily defined, all terms used herein including technological or scientific terms have the same meanings as those generally understood by a person with ordinary skill in the art.

In the present invention, unless explicitly described to the contrary, the word "comprise" and variations such as "comprises" or "comprising", will be understood to imply the inclusion of stated elements but not the exclusion of any other elements.

In various exemplary embodiments of the present invention, each component, function blocks, or means may be composed of one or more lower components, and the electricity, electronic, and mechanical functions performed by each component can be implemented in various known elements or mechanical elements such as electronic circuits, integrated circuits, ASIC (Application Special Integrated Circuit), and may be implemented separately or united in one or more.

On the other hand, the blocks of the attached block diagrams or the steps of flow chart can be interpreted as meaning computer program instructions for performing designated functions that are installed in the processor or memory of the data processing equipment such as general computers, special computers, portable notebook computers, and network computers.

Since these computer program instructions can be stored in a memory provided in a computer device or a memory readable on a computer device, the functions described in the blocks of the block diagram or the steps of the flowchart may be produced as a manufacturing product that contains the command means to perform the functions.

Each block or each step may indicate a part of a module, segment or code comprising one or more executable instructions for executing a specific logical function(s).

Some replaceable exemplary embodiments should be noted that the functions mentioned in the blocks or steps are possible, unlike the determined order.

For example, the two blocks or steps shown in one subsequently may be performed simultaneously or in reverse order, and in some cases, some blocks or steps may be omitted.

FIG. 1 is a diagram illustrating a structure of a service server according to the present invention.

Referring to FIG. 1, the service server 110 according to the present invention is a server capable of performing Internet access management services according to a degree, and includes a degree table maintenance unit 112, a rule table maintenance unit 113, a degree confirmation unit 114, a rule confirmation unit 115, and an access control unit 116.

The degree table maintenance unit 112 is a client terminal that is subject to Internet access management, and stores and maintains a degree table having unique identification information for each of a plurality of pre-registered client terminals, and an access authority degree pre-designated as corresponding to each client terminal (the access authority degree is a degree selected from among a plurality of access authority degrees divided into two or more stages), which are recorded therein.

Here, the unique identification information means unique information for identifying each client terminal, such as Media Access Control (MAC) address, International Mobile Equipment Identity (IMEI), IP address, Token, UUID, etc.

In this regard, it is assumed that the plurality of access authority degrees are configured in the form of '1st degree, 2nd degree, 3rd degree, etc., the degree table may be configured as in Table 1 below.

TABLE 1

| Plurality of client terminals | Unique identification information | Access authority degree |
|---|---|---|
| Client terminal 1 | Unique identification information 1 | 1st degree |
| Client terminal 2 | Unique identification information 2 | 2nd degree |
| Client terminal 3 | Unique identification information 3 | 2nd degree |
| Client terminal 4 | Unique identification information 4 | 1st degree |
| Client terminal 5 | Unique identification information 5 | 3rd degree |
| . . . | . . . | |

The rule table maintenance unit 113 stores and maintains a filtering rule table having a plurality of pre-designated filtering rules, and at least one access authority degree pre-designated as a blocking target according to each filtering rule (the at least one access authority degree is a degree selected from among the plurality of access authority degrees), which are recorded therein.

Here, the plurality of filtering rules refer to rules defining content characteristics for selecting web pages subject to access blocking, and in the plurality of filtering rules, as content characteristics for selecting a web page which is subject to access blocking, a plurality of pre-designated keywords may be defined for each filtering rule.

For example, the plurality of filtering rules may be configured as in Table 2 below.

TABLE 2

| Plurality of filtering rules | Plurality of keywords |
|---|---|
| Filtering rule 1 | keyword 1, keyword 2, keyword 3 |
| Filtering rule 2 | keyword A, keyword B, keyword C |
| Filtering rule 3 | keyword a, keyword b, keyword c |
| . . . | . . . |

In this situation, the filtering rule table may be configured as in Table 3 below.

TABLE 3

| Plurality of filtering rules | Access authority degree specified as blocking target |
|---|---|
| Filtering rule 1 | 4st degree, 3rd degree |
| Filtering rule 2 | 4st degree, 3rd degree, 2nd degree |
| Filtering rule 3 | 4st degree |
| . . . | . . . |

As such, in a situation where the degree table and the filtering rule table exist, when a user of a first client terminal 10 among the plurality of client terminals attempts to access a first web page using the first client terminal 10, the first client terminal 10 may transmit an access approval request for the first web page to the service server 110 according to the present invention before accessing the first web page.

As a result, when a request for approval of access to the first web page is received from the first client terminal 10 by the service server 110, the degree confirmation unit 114 confirms the unique identification information of the first client terminal 10, and then confirms the access authority degree corresponding to the unique identification information of the first client terminal 10 by referring to the degree table.

For example, when the unique identification information of the first client terminal 10 is 'unique identification information 5', the degree confirmation unit 114 may confirm an access authority degree as 3rd degree' corresponding to 'unique identification information 5', which is the unique identification information of the first client terminal 10 by referring to the degree table shown in Table 1 above.

When a first access authority degree is confirmed as the access authority degree corresponding to the unique identification information of the first client terminal 10, the rule confirmation unit 115 confirms whether there is a filtering rule in which content characteristics matching the first web page are defined among the plurality of filtering rules based on contents included in the first web page.

At this time, according to an exemplary embodiment of the present invention, the rule confirmation unit 115 may include a dictionary database 117, a word extraction unit 118, a score designation unit 119, and a confirmation processing unit 120.

The dictionary database 117 stores a plurality of predetermined words and a predetermined embedding vector corresponding to each word.

Usually, expressing a word in the form of a dense vector is called word embedding, and the dense vector is called an embedding vector.

A word embedding method includes Word2Vec, FastText, and GloVe.

In this case, the embedding vector corresponding to each of the plurality of words, as a vector predetermined for each word based on a semantic similarity predetermined between the plurality of words, is a vector designed so that the vector similarity between the embedding vectors of two words is calculated to be higher as the semantic similarity between two words is higher.

For example, the plurality of words are 'word 1, word 2, word 3, . . . ', and among these words, if the semantic similarity between 'word 1 and word 2' is higher than the semantic similarity between 'word 3 and word 50', the vector similarity between the respective embedding vectors of 'word 1 and word 2' may be designed to be calculated higher than the vector similarity between the respective embedding vectors of 'word 3' and 'word 50'.

By such a scheme, with respect to the embedding vectors corresponding to 'word 1, word 2, and word 3' which are the plurality of words, respectively, as an association between two words is higher, the vector similarity between the embedding vectors of two words may be designed to be calculated higher.

In this regard, the dictionary database 117 may store information shown in Table 4 below.

TABLE 4

| Plurality of words | Embedding vector |
|---|---|
| word 1 | $E_1$ |
| word 2 | $E_2$ |
| word 3 | $E_3$ |
| . . . | . . . |

When the first access authority degree is confirmed as the access authority degree corresponding to the unique identification information of the first client terminal 10, the word extraction unit 118 accesses the first web page, crawls a text disclosed in the first web page, and then separates and extracts a plurality of first words constituting the text from the crawled text.

At this time, when crawling the text from the first web page, the word extraction unit 118 crawls a text included in a body of the first web page, and parses a markup language code constituting the first web page, and also jointly crawl the texts such as a domain name and a host name for the first web page.

The score designation unit 119 calculates vector similarities between embedding vectors of a plurality of keywords designated for each filtering rule and embedding vectors of the plurality of first words, and then designates a total average of the calculated vector similarities as a matching score corresponding to each filtering rule.

The confirmation processing unit 120 confirms whether a matching score having the maximum value among the matching scores corresponding to the plurality of filtering rules exceeds a pre-designated matching determination threshold, and if it is confirmed that the matching score exceeds the pre-designated matching determination threshold, the confirmation processing unit 120 confirms and processes a filtering rule in which the matching score having the maximum value is specified as a filter rule in which the content characteristics matching the first web page are defined.

Hereinafter, an operation of the rule confirmation unit 115 will be described in detail as an example.

First, it is assumed that the plurality of filtering rules is configured as in Table 2 above, and the degree confirmation unit 114 confirms the unique identification information of the first client terminal 10 as 'unique identification information 5' and the access authority degree of the first client terminal 10 as '3rd degree'.

Then, the word extraction unit 118 accesses the first web page to crawl the text disclose the first web page, and then separate and extract a plurality of first words constituting the text from the crawled text.

As a result, when it is assumed that 'word A, word B, and word C' are separated and extracted by the word extraction unit 118, the score designation unit 119 may calculate vector similarities between the embedding vectors of the plurality of keywords designated in each filter rule and the embedding vectors for 'word A, word B, and word C' which are the plurality of first words, with respect to each of the plurality of filtering rules, and then designate a total average of the calculated vector similarities as the matching score corresponding to each filtering rule.

In this regard, the score designation unit 119 may calculate vector similarities between the embedding vectors of 'keyword 1, keyword 2, and keyword 3' and the embedding vectors of 'word A, word B, and word C' with respect to 'filtering rule 1'.

Specifically, the score designation unit 119 may calculate 'vector similarity 1' between the embedding vector of 'keyword 1' and the embedding vector of 'word A', 'vector similarity 2' between the embedding vector of 'keyword 2' and the embedding vector of 'word B', 'vector similarity 3' between the embedding vector of 'keyword 1' and the embedding vector of 'word C', 'vector similarity 4' between the embedding vector of 'keyword 2' and the embedding vector of 'word A', 'vector similarity 5' between the embedding vector of 'keyword 2' and the embedding vector of 'word B', 'vector similarity 6' between the embedding vector of 'keyword 2' and the embedding vector of 'word C', 'vector similarity 7' between the embedding vector of 'keyword 3' and the embedding vector of word A', 'vector similarity 8' between the embedding vector of 'keyword 3' and the embedding vector of 'word B', and 'vector similarity 9' between the embedding vector of 'keyword 3' and the embedding vector of 'word C'.

Then, the score designation unit 119 may calculate a total average of 'vector similarities 1, 2, 3, 4, 5, 6, 7, 8, 9' as the matching score corresponding to 'filtering rule 1'.

By such a scheme, the score designation unit 119 may also calculate matching scores corresponding to 'filtering rule 2, filtering rule 3, etc.', respectively.

Thereafter, the confirmation processing unit 120 confirms whether a matching score having the maximum value among the matching scores corresponding to the plurality of filtering rules exceeds a pre-designated matching determination threshold, and if it is confirmed that the matching score exceeds the pre-designated matching determination threshold, the confirmation processing unit 120 may confirm and process a filtering rule in which the matching score having the maximum value is specified as a filter rule in which the content characteristics matching the first web page are defined.

In this regard, when it is assumed that the matching score for 'filtering rule 2' among the matching scores calculated for 'filtering rule 1, filtering rule 2, filtering rule 3, etc.' has the maximum value, the confirmation processing unit 120 may confirm whether the matching score for 'filtering rule 2' exceeds the matching determination threshold.

When it is confirmed that the matching score for 'filtering rule 2' exceeds the matching determination threshold, the confirmation processing unit 120 may confirm 'filtering rule 2' as the filtering rule in which the content characteristics matching the first web page are defined.

That is, the rule confirmation unit 115 according to the present invention selects a filtering rule having the maximum similarity between the words included in the first web page and the keywords defined in each filtering rule, and then when it is confirmed that the similarity calculated for the selected filtering rule is similar enough to be higher than a predetermined threshold, the rule confirmation unit 115 may confirm the selected filtering rule as the filtering rule in which the content characteristics matching the first web page are defined.

As such, as a result of confirming whether there is the filtering rule in which the content characteristics matching the first web page are defined among the plurality of filtering rules through the rule confirmation unit 115, when it is confirmed that there is the first filtering rule as the filtering rule matching the first web page among the plurality of filtering rules, the access control unit 116 confirms at least one second access authority degree designated as the blocking target according to the first filtering rule from the filtering rule table, and then when the first access authority degree is included in the at least one second access authority degree, the access control unit 116 blocks the access to the first web page of the first client terminal 10 and when the first access authority degree is not included in the at least one second access authority degree, the access control unit permits the access of the first client terminal to the first web page.

For example, it is assumed that 'unique identification information 5' is confirmed as the unique identification information of the first client terminal 10 and '3rd degree' is confirmed as the access authority degree of the first client terminal 10 by the degree confirmation unit 114 and it is assumed that 'filtering rule 2' is confirmed as the filtering rule matching the first web page by the rule confirmation unit 115.

Then, the access control unit 116 may confirm '4th degree, 3rd degree, and 2nd degree', which are the access authority degrees designated as the blocking targets according to the 'filtering rule 2', from the filtering rule table shown in Table 3 above.

At this time, '3rd degree', which is the access authority degree of the first client terminal 10, is included in '4th degree, 3rd degree, 2nd degree', which are access authority degrees according to 'filtering rule 2', so the access control unit 116 may block the access of the first client terminal 10 to the first web page.

In this regard, the access control unit 116 may send an access rejection response to the first client terminal 10 to prevent the first client terminal 10 from accessing the first web page, and as a result, the first client terminal 10 may not access the first web page.

However, when it is assumed that the access authority degree of the first client terminal 10 is '1st degree' is confirmed, 1st degree' is not is included in '4th degree, 3rd degree, 2nd degree', which are access authority degrees designated as the blocking targets according to 'filtering rule 2', so the access control unit 116 may permit the access of the first client terminal 10 to the first web page.

That is, if the first client terminal 10 is a terminal having a high authority degree to access various web pages, the user of the first client terminal 10 accesses the first web page to enjoy contents.

According to an exemplary embodiment of the present invention, the access control unit 116, when it is confirmed that there is no filtering rule matching the first web page among the plurality of filtering rules, may permit the access of the first client terminal 10 to the first web page.

In this regard, as a result of confirming whether there is the filtering rule matching the first web page by the rule confirmation unit 115, when it is confirmed that there is no filtering rule matching the first web page as it is confirmed that there is no filtering rule in which a keyword having a high similarity to the words included in the first web page is defined, the first web page may be regarded as a clean web page not corresponding to the web page which becomes the blocking target, so the access control unit 116 may permit the access of the first client terminal 10 to the first web page.

According to an exemplary embodiment of the present invention, the service server 110 may further include a component capable of controlling the Internet usage time of the client terminal according to the access authority degree set in the client terminal.

In this regard, according to an exemplary embodiment of the present invention, the service server 110 may further include a time table maintenance unit 127 storing and maintaining a time table in which pre-designated Internet usage permission time zones corresponding to the plurality of access authority degrees, respectively are recorded.

For example, the time table may be configured as in Table 5 below.

TABLE 5

| Plurality of access authority degrees | Internet usage permission time zone |
|---|---|
| 1st degree | Time zone 1 |
| 2nd degree | Time zone 2 |
| 3rd degree | Time zone 3 |
| . . . | . . . |

At this time, according to an exemplary embodiment of the present invention, when the rule conformation unit 115 confirms that the access authority degree of the first client terminal 10 is the first access authority degree as a result of confirming, through the degree confirmation unit 114, the access authority degree corresponding to the unique identification information of the first client terminal 10, the rule confirmation unit 115 may judge whether a current time belongs to an Internet usage permission time zone corresponding to the first access authority degree by referring the time table before confirming whether there is the filtering rule in which the content characteristics matching the first web page are defined among the plurality of filtering rules.

As a result, when it is judged that the current time does not belong to an Internet usage permission time zone corresponding to the first access authority degree, the rule confirmation unit 115 may block the access of the first client terminal 10 to the first web page immediately without a process of confirming whether there is the filtering rule in which the content characteristics matching the first web page are defined.

However, when it is judged that the current time does belongs to an Internet usage permission time zone corresponding to the first access authority degree, the rule confirmation unit 115 may confirm whether there is the filtering rule in which the content characteristics matching the first web page are defined among the plurality of filtering rules based on the contents included in the first web page.

For example, when the access authority degree of the first client terminal 10 is '3rd degree', 'time zone 3' corresponding to '3rd degree' is '09:00 to 18:00', and the current time is '18:15', the rule confirmation unit 115 may immediately block the access of the first client terminal 10 to the first web page because the current time '18:15' does not belong to 'time zone 3'.

However, when the current time is '17:30', the rule confirmation unit 115 may confirm whether there is the filtering rule in which the content characteristics matching the first web page are defined among the plurality of filtering rules based on the contents included in the first web page in order to perform a subsequent process for Internet access management without immediately blocking the access to the first web page of the first client terminal 10 because the current time '17:30' belongs to the 'time zone 3'.

According to an exemplary embodiment of the present invention, the service server 110 may further include an identification information recording unit 121 and a degree recording unit 122 as components for supporting for an administrator to set a predetermined access authority degree to a new client terminal.

When the identification information recording unit 121 receives a setting request instruction access authority degree of the new client terminal from an administrator terminal 20, the identification information recording unit 121 transmits, to the administrator terminal 20, an information request instruction for requesting transmission of unique identification information for the new client terminal, and when receiving the unique identification information for the new client terminal as a response to the information request instruction from the administrator terminal 20, the identification information recording unit 121 records the unique identification information for the new client terminal on the degree table. The degree recording unit 122 transmits a degree request instruction for requesting command requesting replying the information on the access authority degree to be set for the new client terminal to the administrator terminal 20, and then, when information on a third access authority degree which is any one of the plurality of access authority degrees is replied as a response to the degree request instruction from the administrator terminal 20, records the third access authority degree to correspond to the unique identification information of the new client terminal on the degree table.

In this case, according to an exemplary embodiment of the present invention, the identification information recording unit 121 may further include a component that performs mutual authentication with the administrator terminal 20 when the setting request instruction of the access authority degree for the new client terminal is received from the administrator terminal 20, and processes a process for setting the access authority degree for the new client terminal to be conducted when the mutual authentication is completed.

In this regard, the identification information recording unit 121 may include an authentication information storage unit 123, a generation unit 124, an information request unit 125, and a recording processing unit 126.

The authentication information storage unit 123 stores a predetermined authentication number of n (n is a natural number of 2 or more) digits and a predetermined hash function that are previously shared with the administrator terminal 20.

For example, when n is '3', an authentication number of '341' may be stored in the authentication information storage unit 123.

When the setting request instruction of the access authority degree for the new client terminal is received from the administrator terminal 20, the generation unit 124 randomly generates a serial number of n digits, generates a row vector having a number of each digit constituting the serial number as a component and a column vector having a number of each digit constituting the authentication number as the component, and then calculates a matrix multiplication of the row vector and the column vector to generate a first calculation value, and applies the first calculation value into the hash function as the input to generate a first hash value.

In this regard, as in the above example, when n is '3' and the authentication number is '341', the generation unit 124 may randomly generate a 3-digit serial number such as '215'.

Then, the generation unit 124 generates a row vector having a number of each digit constituting the serial number as the component, as '[2 1 5]', and generates a column vector having a number of each digit constituting the authentication number as the component, as '[3 4 1]', and then calculates a matrix multiplication of the row vector and the column vector to generate a first calculation value, '15', and applies the first calculation value into the hash function as the input to generate the first hash value.

The information request unit 125 encrypts the serial number with a predetermined public key (a private key forming a key pair with the public key is stored in the administrator terminal 20), and then transmits the encrypted serial number to the administrator terminal 20, and at the same time, transmits the information request instruction for requesting transmission of the unique identification information for the new client terminal to the administrator terminal 20.

In this case, according to an exemplary embodiment of the present invention, the administrator terminal 20 may pre-store, in a memory, the authentication number, the hash function, and the private key, and when the encrypted serial number is received from the service server 110 jointly with the information request instruction, decrypt the encrypted serial number based on the private key stored in the memory, and then generate a row vector having a number of each digit constituting the decrypted serial number as the component and generates a column vector having a number of each digit constituting the authentication number stored in the memory as the component, and then calculate a matrix multiplication of the row vector and the column vector to generate a first calculation value, and applies the first calculation value into the hash function as an input to generate the first hash value stored in the memory, and then encrypt the unique identification information for the new client terminal based on the first hash value and transmit the encrypted unique identification information to the service server 110.

In this regard, as in the above-described example, when n is '3', the authentication number is '341', and the serial number is '215', the administrator terminal 20 may decrypt, when receiving the encrypted serial number from the service server 110 jointly with the information request instruction, the encrypted serial number based on the private key stored in the memory, and restore '215'.

Then, the administrator terminal 20 may generate a row vector having a number of each digit constituting the decrypted serial number as the component, as '[2 1 5]', and generate a column vector having a number of each digit constituting the authentication number stored in the memory as the component, as '[3 4 1]', and then calculate a matrix multiplication of the row vector and the column vector to generate the first calculation value, '15'.

Thereafter, the administrator terminal 20 may apply the first calculation value to the hash function stored in the memory as the input to generate the first hash value, and then encrypt the unique identification information for the new client terminal based on the first hash value and transmits the encrypted unique identification information to the service server 110.

As such, when the service server 110 receives the unique identification information for the new client terminal in a state of being encrypted based on the first hash value from the administrator terminal 20 as the response to the information request instruction, the recording processing unit 126 decrypts the encrypted unique identification information for the new client terminal based on the first hash value, and then records the decrypted unique identification information for the new client terminal based on the first hash value in the degree table.

According to an exemplary embodiment of the present invention, when the first web page is a web page set to enable only a client terminal having a fixed IP address, which is pre-registered in a content providing server (not illustrated) providing the first web page to access, the service server 110 may further include a component for supporting, even though a change current IP address of a client terminal having an access authority to the first web page, the client terminal to be able to access the first web page.

In this regard, it is assumed that fixed IP addresses of client terminals pre-designated to access the first web page are registered in the content providing server providing the first web page.

In this case, when fixed IP addresses for some client terminals among the plurality of client terminals are also registered in the content providing server, the service server 110 may store an IP table in which unique identification information of some client terminals and the fixed IP addresses of the respective client terminals registered in the content providing server are recorded to correspond to each other.

In this case, when the service server 110 receives an access approval request to the first web page from any one client terminal among some client terminals, the service server 110 may confirm the access authority degree of the client terminal by referring to the unique identification information of the client terminal, and then determine whether to permit the access of the client terminal to the first web page based on the access authority degree of the client terminal.

When it is determined that the client terminal is permitted to access the first web page as a result of determining whether to permit the access, the service server 110 may confirms the current IP address of the client terminal, and then judge whether the current IP address of the client terminal matches the fixed IP address recorded to correspond to the unique identification information of the client terminal in the IP table.

When it is judged that the current IP address of the client terminal does not match the fixed IP address recorded in the IP table, the service server 110 may extract the fixed IP address of the client terminal from the IP table, and then transmit information on the fixed IP address of the client terminal to the content providing server providing the first web page.

Then, even though it is confirmed that the current IP address of the client terminal does not match the fixed IP address registered in the content providing server, the content providing server may confirm that the client terminal is the registered client terminal having the access authority to the first web page by referring the information on the fixed IP address for the client terminal, which is received from the service server 110 of the present invention, and the content providing server provides the first web page to the client terminal through the confirmation to support the client terminal to access the first web page.

FIG. 2 is a flowchart illustrating an operating method of a service server capable of performing Internet access management services according to degrees according to the present invention.

In step S210, a degree table having unique identification information for each of a plurality of pre-registered client terminals as a client terminal which is subject to Internet access management, and an access authority degree pre-designated as corresponding to each client terminal (the access authority degree is a degree selected from among a plurality of access authority degrees divided into two or more stages), which are recorded therein is stored and maintained.

In step S220, a filtering rule table having a plurality of pre-designated filtering rules (the plurality of filtering rules are rules that define content characteristics for selecting a web page which is subject to access blocking), and at least one access authority degree pre-designated as a blocking target according to each filtering rule (the at least one access authority degree is a degree selected from among the plurality of access authority degrees), which are recorded therein is stored and maintained.

In step S230, when an access approval request to the first web page is received from a first client terminal among the plurality of client terminals, unique identification information of the first client terminal is confirmed, and then an access authority degree corresponding to the unique identification information of the first client terminal is confirmed by referring to the degree table.

In step S240, when a first access authority degree is confirmed as the access authority degree corresponding to the unique identification information of the first client terminal, it is confirmed whether there is a filtering rule in which content characteristics matching the first web page are defined among the plurality of filtering rules based on contents included in the first web page.

In step S250, when it is confirmed that there is the first filtering rule as the filtering rule matching the first web page among the plurality of filtering rules, at least one second access authority degree designated as the blocking target according to the first filtering rule is confirmed by referring to the filtering rule table, and then when the first access authority degree is included in the at least one second access authority degree, the access to the first web page of the first client terminal is blocked and when the first access authority degree is not included in the at least one second access authority degree, the access of the first client terminal to the first web page is permitted.

In this case, according to an exemplary embodiment of the present invention, a plurality of keywords pre-designated for each filtering rule is defined as the content characteristics for selecting the web page which is subject to access blocking in the plurality of filtering rules.

In this case, step S250 may include a step of maintaining a dictionary database storing a plurality of predetermined words and a predetermined embedding vector (the embedding vector corresponding to each of the plurality of words, as a vector predetermined for each word based on a semantic similarity predetermined between the plurality of words, is a vector designed so that the vector similarity between the embedding vectors of two words is calculated to be higher as the semantic similarity between two words is higher) corresponding to each word, a step of when the first access authority degree is confirmed as the access authority degree corresponding to the unique identification information of the first client terminal, accessing the first web page, crawls a text disclosed in the first web page, and then separating and extracting a plurality of first words constituting the text from the crawled text, a step of calculating vector similarities between embedding vectors of a plurality of keywords designated for each filtering rule and embedding vectors of the plurality of first words, and then designating a total average of the calculated vector similarities as a matching score corresponding to each filtering rule, and a step of confirming whether a matching score having the maximum value among the matching scores corresponding to the plurality of filtering rules exceeds a pre-designated matching determination threshold, and if it is confirmed that the matching score exceeds the pre-designated matching determination threshold, and confirming and processing a filtering rule in which the matching score having the maximum value is specified as a filter rule in which the content characteristics matching the first web page are defined.

According to an exemplary embodiment of the present invention, in step S250, when it is confirmed that there is no filtering rule matching the first web page among the plurality of filtering rules, the access of the first client terminal to the first web page may be permitted.

According to an exemplary embodiment of the present invention, the operating method of the service server may further include a step of storing and maintaining a time table in which pre-designated Internet usage permission time zones corresponding to the plurality of access authority degrees, respectively are recorded.

In this case, in step S240, when it is confirmed that the first access authority degree is the access authority degree corresponding to the unique identification information of the first client terminal, whether a current time belongs to an Internet usage permission time zone corresponding to the first access authority degree may be judged by referring the time table before confirming whether there is the filtering rule in which the content characteristics matching the first web page are defined, and then when it is judged that the current time does not belong to an Internet usage permission time zone corresponding to the first access authority degree, the access of the first client terminal to the first web page may be blocked, and when it is judged that the current time does belongs to an Internet usage permission time zone corresponding to the first access authority degree, it may be confirmed whether there is the filtering rule in which the content characteristics matching the first web page are defined among the plurality of filtering rules based on the contents included in the first web page.

According to an exemplary embodiment of the present invention, the operating method of the service server may further include a step of when a setting request instruction access authority degree of the new client terminal is received from an administrator terminal, transmitting, to the administrator terminal, an information request instruction for requesting transmission of unique identification information for the new client terminal, and when receiving the unique identification information for the new client terminal as a response to the information request instruction from the administrator terminal, recording the unique identification information for the new client terminal on the degree table, and a step of transmitting a degree request instruction for requesting command requesting replying the information on the access authority degree to be set for the new client terminal to the administrator terminal, and then, when information on a third access authority degree which is any one of the plurality of access authority degrees is replied as a response to the degree request instruction from the administrator terminal, recording the third access authority degree to correspond to the unique identification information of the new client terminal on the degree table.

In this case, according to an exemplary embodiment of the present invention, the step of recording in the degree table may include a step of maintaining an authentication information storage unit storing a predetermined authentication number of n (n is a natural number of 2 or more) digits and a predetermined hash function that are previously shared with the administrator terminal, a step of when the setting request instruction of the access authority degree for the new client terminal is received from the administrator terminal, randomly generating a serial number of n digits, generating a row vector having a number of each digit constituting the serial number as a component and a column vector having a number of each digit constituting the authentication number as the component, and then calculating a matrix multiplication of the row vector and the column vector to generate a first calculation value, and applying the first calculation value into the hash function as the input to generate a first hash value, and, a step of encrypting the serial number with a predetermined public key (a private key forming a key pair with the public key is stored in the administrator terminal), and then transmitting the encrypted serial number to the administrator terminal, and at the same time, transmitting the information request instruction for requesting transmission of the unique identification information for the new client terminal to the administrator terminal, and a step of decrypting, when the unique identification information for the new client terminal is received in a state of being encrypted based on the first hash value from the administrator terminal as the response to the information request instruction, the unique identification information for the new client terminal based on the first hash value, and then recording the unique identification information for the new client terminal in the degree table.

In this case, the administrator terminal may pre-store, in a memory, the authentication number, the hash function, and the private key, and when the encrypted serial number is received from the service server jointly with the information request instruction, decrypt the encrypted serial number based on the private key stored in the memory, and then generate a row vector having a number of each digit constituting the decrypted serial number as the component and generates a column vector having a number of each digit constituting the authentication number stored in the memory as the component, and then calculate a matrix multiplication of the row vector and the column vector to generate a first calculation value, and applies the first calculation value into the hash function as an input to generate the first hash value stored in the memory, and then encrypt the unique identification information for the new client terminal based on the first hash value and transmit the encrypted unique identification information to the service server.

Hereinabove the operating method of the service server according to an exemplary embodiment of the present invention is described with reference to FIG. 2.

Here, since the operating method of the service server according to an exemplary embodiment of the present invention may correspond to a configuration for an operation of the service server 110, which is described by using FIG. 1, a more detailed description thereof will be omitted.

The operating method of the service server according to an exemplary embodiment of the present invention may be implemented by a computer program stored in a storage medium for executing the computer program through coupling with a computer.

Meanwhile, the operating method of the service server according to an exemplary embodiment of the present invention is implemented in a form of a program command which may be performed through various computer means and may be recorded in the computer readable medium.

The computer readable medium may include a program command, a data file, a data structure, etc., singly or combinationally.

The program command recorded in the medium may be specially designed and configured for the present invention, or may be publicly known to and used by those skilled in the computer software field.

An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command.

An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. A service server for performing Internet access management services according to degrees, the service server comprising:
  a degree table maintenance unit storing and maintaining a degree table having unique identification information for each of a plurality of pre-registered client terminals as a client terminal which is subject to Internet access management, and an access authority degree pre-designated as corresponding to each client terminal which are recorded therein, wherein the access authority degree is a degree selected from among a plurality of access authority degrees divided into two or more stages;
  a rule table maintenance unit storing and maintaining a filtering rule table having a plurality of pre-designated filtering rules, wherein the plurality of filtering rules are rules that define content characteristics for selecting a web page which is subject to access blocking, and at least one access authority degree pre-designated as a blocking target according to each filtering rule of the plurality of filtering rules, wherein the at least one access authority degree is a degree selected from among the plurality of access authority degrees, which are recorded therein;
a degree confirmation unit confirming, when an access approval request to access a first web page is received from a first client terminal among the plurality of client terminals, unique identification information of the first client terminal, and then confirming an access authority degree corresponding to the unique identification information of the first client terminal by referring to the degree table;
a rule confirmation unit confirming, when a first access authority degree is confirmed as the access authority degree corresponding to the unique identification information of the first client terminal, whether there is a filtering rule in which content characteristics matching the first web page are defined among the plurality of filtering rules based on contents included in the first web page;
an access control unit confirming, when it is confirmed that there is a first filtering rule as the filtering rule matching the first web page among the plurality of filtering rules, at least one second access authority degree designated as the blocking target according to the first filtering rule from the filtering rule table, and then when the first access authority degree is included in the at least one second access authority degree, blocking the access to the first web page of the first client terminal and when the first access authority degree is not included in the at least one second access authority degree, permitting the access of the first client terminal to the first web page; and
an identification information recording unit including:
a generation unit randomly generating, when a setting request instruction for an access authority degree of a new client terminal is received from the administrator terminal, a serial number of n digits and a row vector having a number of each digit constituting the serial number as a component and a column vector having a number of each digit constituting a predetermined authentication number of n, wherein n is a natural number of 2 or more digits, as the component, calculating a matrix multiplication of the row vector and the column vector to generate a first calculation value, and applying the first calculation value into a predetermined hash function as input to generate a first hash value;
a recording processing unit decrypting an encrypted unique identification information for the new client terminal based on the first hash value, and recording the decrypted unique identification information for the new client terminal based on the first hash value in the degree table.

2. The service server of claim 1, wherein a plurality of keywords pre-designated for each filtering rule is defined as the content characteristics for selecting the web page which is subject to access blocking in the plurality of filtering rules, and
the rule confirmation unit includes
a dictionary database storing an embedding vector predetermined corresponding to each word of a predetermined plurality of words, wherein the embedding vector corresponding to each of the plurality of words, as vector predetermined for each word based on a semantic similarity predetermined between the plurality of words, is a vector designed so that the vector similarity between the embedding vectors of two words is calculated to be higher as the semantic similarity between two words is higher;
a word extraction unit accessing, when the first access authority degree is confirmed as the access authority degree corresponding to the unique identification information of the first client terminal, the first web page, crawling a text disclosed in the first web page, and then separating and extracting a plurality of first words constituting the text from the crawled text;
a score designation unit calculating vector similarities between embedding vectors of a plurality of keywords designated for each filtering rule and embedding vectors of the plurality of first words, and then designating a total average of the calculated vector similarities as a matching score corresponding to each filtering rule; and
a confirmation processing unit confirming whether a matching score having a maximum value among the matching scores corresponding to the plurality of filtering rules exceeds a pre-designated matching determination threshold, and if it is confirmed that the matching score exceeds the pre-designated matching determination threshold, confirming and processing a filtering rule in which the matching score having the maximum value is specified as a filter rule in which the content characteristics matching the first web page are defined.

3. The service server of claim 1, further comprising:
a time table maintenance unit storing and maintaining a time table in which pre-designated Internet usage permission time zones corresponding to the plurality of access authority degrees, respectively are recorded;
wherein the rule confirmation unit judges, when it is confirmed that the first access authority degree is the access authority degree corresponding to the unique identification information of the first client terminal, whether a current time belongs to an Internet usage permission time zone corresponding to the first access authority degree by referring the time table before confirming whether there is the filtering rule in which the content characteristics matching the first web page are defined, and then when it is judged that the current time does not belong to an Internet usage permission time zone corresponding to the first access authority degree, blocks the access of the first client terminal to the first web page, and when it is judged that the current time does belongs to an Internet usage permission time zone corresponding to the first access authority degree, and confirms whether there is the filtering rule in which the content characteristics matching the first web page are defined among the plurality of filtering rules based on the contents included in the first web page.

4. The service server of claim 1, further comprising:
the identification information recording unit transmitting, when receiving the setting request instruction for the access authority degree of the new client terminal from the administrator terminal, an information request instruction for requesting transmission of unique identification information for the new client terminal to the administrator terminal, and when receiving the unique identification information for the new client terminal as a response to the information request instruction from an administrator terminal, recording the unique identification information for the new client terminal on the degree table; and
a degree recording unit transmitting a degree request instruction for requesting command requesting replying information on access authority degree to be set for the new client terminal to the administrator terminal and then, when information on a third access authority degree which is any one of the plurality of access authority degrees is replied as a response to the degree request instruction from the administrator terminal, recording the third access authority degree to correspond to the unique identification information of the new client terminal on the degree table.

5. The service server of claim 4, wherein the identification information recording unit includes an authentication information storage unit storing the predetermined authentication number of n and the predetermined hash function that are previously shared with the administrator terminal;

an information request unit encrypting the serial number with a predetermined public key, wherein a private key forming a key pair with the public key is stored in the administrator terminal, and then transmitting the encrypted serial number to the administrator terminal, and at the same time, transmitting the information request instruction for requesting transmission of the unique identification information for the new client terminal to the administrator terminal; and the recording processing unit decrypting, when the unique identification information for the new client terminal is received in a state of being encrypted based on the first hash value from the administrator terminal as the response to the information request instruction, the encrypted unique identification information for the new client terminal based on the first hash value, wherein the administrator terminal pre-stores, in a memory, the authentication number, the hash function, and the private key, and when the encrypted serial number is received from the service server jointly with the information request instruction, decrypts the encrypted serial number based on the private key stored in the memory, and then generates a row vector having a number of each digit constituting the decrypted serial number as the component and generates a column vector having a number of each digit constituting the authentication number stored in the memory as the component, and then calculates a matrix multiplication of the row vector and the column vector to generate a first calculation value, and applies the first calculation value into the hash function as an input to generate the first hash value stored in the memory, and then encrypts the unique identification information for the new client terminal based on the first hash value and transmits the encrypted unique identification information to the service server.

6. An operating method of a service server for performing Internet access management services according to degrees, the operating method comprising:

storing and maintaining a degree table having unique identification information for each of a plurality of pre-registered client terminals as a client terminal which is subject to Internet access management, and an access authority degree pre-designated as corresponding to each client terminal, which are recorded therein, wherein the access authority degree is a degree selected from among a plurality of access authority degrees divided into two or more stages;

storing and maintaining a filtering rule table having a plurality of pre-designated filtering rules, wherein the plurality of filtering rules are rules that define content characteristics for selecting a web page which is subject to access blocking, and at least one access authority degree pre-designated as a blocking target according to each filtering rule of the plurality of filtering rules, wherein the at least one access authority degree is a degree selected from among the plurality of access authority degrees, which are recorded therein;

confirming, when an access approval request to access a first web page is received from a first client terminal among the plurality of client terminals, unique identification information of the first client terminal, and then confirming an access authority degree corresponding to the unique identification information of the first client terminal by referring to the degree table;

confirming, when a first access authority degree is confirmed as the access authority degree corresponding to the unique identification information of the first client terminal, whether there is a filtering rule in which content characteristics matching the first web page are defined among the plurality of filtering rules based on contents included in the first web page;

confirming, when it is confirmed that there is a first filtering rule as the filtering rule matching the first web page among the plurality of filtering rules, at least one second access authority degree designated as the blocking target according to the first filtering rule from the filtering rule table, and then when the first access authority degree is included in the at least one second access authority degree, blocking the access to the first web page of the first client terminal and when the first access authority degree is not included in the at least one second access authority degree, permitting the access of the first client terminal to the first web page; and randomly generating, when a setting request instruction for an access authority degree of a new client terminal is received from the administrator terminal, a serial number of n digits and a row vector having a number of each digit constituting the serial number as a component and a column vector having a number of each digit constituting a predetermined authentication number of n, wherein n is a natural number of 2 or more digits, as the component, calculating a matrix multiplication of the row vector and the column vector to generate a first calculation value, and applying the first calculation value into a predetermined hash function as input to generate a first hash value;

decrypting an encrypted unique identification information for the new client terminal based on the first hash value, and recording the decrypted unique identification information for the new client terminal based on the first hash value in the degree table.

7. The operating method of claim 6, wherein a plurality of keywords pre-designated for each filtering rule is defined as the content characteristics for selecting the web page which is subject to access blocking in the plurality of filtering rules, and the confirming of whether there is the filtering rule includes maintaining a dictionary database storing an embedding vector predetermined corresponding to each word of a predetermined plurality of words, wherein the embedding vector corresponding to each of the plurality of words, as vector predetermined for each word based on a semantic similarity predetermined between the plurality of words, is a vector designed so that the vector similarity between the embedding vectors of two words is calculated to be higher as the semantic similarity between two words is higher;

accessing, when the first access authority degree is confirmed as the access authority degree corresponding to the unique identification information of the first client terminal, the first web page, crawling a text disclosed in the first web page, and then separating and extracting a plurality of first words constituting the text from the crawled text;

calculating vector similarities between embedding vectors of a plurality of keywords designated for each filtering rule and embedding vectors of the plurality of first words, and then designating a total average of the calculated vector similarities as a matching score corresponding to each filtering rule; and confirming whether a matching score having a maximum value among the matching scores corresponding to the plurality of filtering rules exceeds a pre-designated matching determination threshold, and if it is confirmed that the matching score exceeds the pre-designated matching determination threshold, confirming and processing a filtering rule in which the matching score having the maximum value is specified as a filter rule in which the content characteristics matching the first web page are defined.

8. The operating method of claim 6, further comprising:

storing and maintaining a time table in which pre-designated Internet usage permission time zones corresponding to the plurality of access authority degrees, respectively are recorded, wherein in the confirming of whether there is the filtering rule, when it is confirmed that the first access authority degree is the access authority degree corresponding to the unique identification information of the first client terminal, it is judged whether a current time belongs to an Internet usage permission time zone corresponding to the first access authority degree by referring the time table before confirming whether there is the filtering rule in which the content characteristics matching the first web page are defined, and then when it is judged that the current time does not belong to an Internet usage permission time zone corresponding to the first access authority degree, the access of the first client terminal to the first web page is blocked, and when it is judged that the current time does belongs to an Internet usage permission time zone corresponding to the first access authority degree, and it is confirmed whether there is the filtering rule in which the content characteristics matching the first web page are defined among the plurality of filtering rules based on the contents included in the first web page.

9. The operating method of claim 6, further comprising:

when receiving the setting request instruction for the access authority degree of the new client terminal from the administrator terminal, transmitting, to the administrator terminal, an information request instruction for requesting transmission of unique identification information for the new client terminal, and when receiving the unique identification information for the new client terminal as a response to the information request instruction from the administrator terminal, recording the unique identification information for the new client terminal on the degree table; and transmitting a degree request instruction for requesting command requesting replying information on access authority degree to be set for the new client terminal to the administrator terminal, and then, when information on a third access authority degree which is any one of the plurality of access authority degrees is replied as a response to the degree request instruction from the administrator terminal, recording the third access authority degree to correspond to the unique identification information of the new client terminal on the degree table.

10. The operating method of claim 9, wherein the recording in the degree table includes maintaining an authentication information storage unit storing the predetermined authentication number of n, and the predetermined hash function that are previously shared with the administrator terminal;

encrypting the serial number with a predetermined public key, wherein a private key forming a key pair with the public key is stored in the administrator terminal, and then transmitting the encrypted serial number to the administrator terminal, and at the same time, transmitting the information request instruction for requesting transmission of the unique identification information for the new client terminal to the administrator terminal; and decrypting, when the unique identification information for the new client terminal is received in a state of being encrypted based on the first hash value from the administrator terminal as the response to the information request instruction, the encrypted unique identification information for the new client terminal based on the first hash value, wherein the administrator terminal pre-stores, in a memory, the authentication number, the hash function, and the private key, and when the encrypted serial number is received from the service server jointly with the information request instruction, decrypts the encrypted serial number based on the private key stored in the memory, and then generates a row vector having a number of each digit constituting the decrypted serial number as the component and generates a column vector having a number of each digit constituting the authentication number stored in the memory as the component, and then calculates a matrix multiplication of the row vector and the column vector to generate a first calculation value, and applies the first calculation value into the hash function as an input to generate the first hash value stored in the memory, and then encrypts the unique identification information for the new client terminal based on the first hash value and transmits the encrypted unique identification information to the service server.

11. A non-transitory computer readable recording medium having a program recorded therein which when executed by a computer, performs an operation of a service server for performing Internet access management services according to degrees, the operation comprising:

storing and maintaining a degree table having unique identification information for each of a plurality of pre-registered client terminals as a client terminal which is subject to Internet access management, and an access authority degree pre-designated as corresponding to each client terminal, which are recorded therein, wherein the access authority degree is a degree selected from among a plurality of access authority degrees divided into two or more stages;

storing and maintaining a filtering rule table having a plurality of pre-designated filtering rules, wherein the plurality of filtering rules are rules that define content characteristics for selecting a web page which is subject to access blocking, and at least one access authority degree pre-designated as a blocking target according to each filtering rule of the plurality of filtering rules, wherein the at least one access authority degree is a degree selected from among the plurality of access authority degrees, which are recorded therein;

confirming, when an access approval request to access a first web page is received from a first client terminal among the plurality of client terminals, unique identification information of the first client terminal, and then confirming an access authority degree corresponding to the unique identification information of the first client terminal by referring to the degree table;

confirming, when a first access authority degree is confirmed as the access authority degree corresponding to the unique identification information of the first client terminal, whether there is a filtering rule in which content characteristics matching the first web page are defined among the plurality of filtering rules based on contents included in the first web page;

confirming, when it is confirmed that there is a first filtering rule as the filtering rule matching the first web page among the plurality of filtering rules, at least one second access authority degree designated as the blocking target according to the first filtering rule from the filtering rule table, and then when the first access authority degree is included in the at least one second access authority degree, blocking the access to the first web page of the first client terminal and when the first access authority degree is not included in the at least one second access authority degree, permitting the access of the first client terminal to the first web page; and randomly generating, when a setting request instruction for an access authority degree of a new client terminal is received from the administrator terminal, a serial number of n digits and a row vector having a number of each digit constituting the serial number as a component and a column vector having a number of each digit constituting a predetermined authentication number of n, wherein n is a natural number of 2 or more digits, as the component, calculating a matrix multiplication of the row vector and the column vector to generate a first calculation value, and applying the first calculation value into a predetermined hash function as input to generate a first hash value;

decrypting an encrypted unique identification information for the new client terminal based on the first hash value, and recording the decrypted unique identification information for the new client terminal based on the first hash value in the degree table.

* * * * *